United States Patent [19]

Grover et al.

[11] Patent Number: 4,612,636
[45] Date of Patent: Sep. 16, 1986

[54] MULTIPLE CHANNEL DEPACKETIZER

[75] Inventors: Wayne D. Grover; Martin C. Lefebvre, both of Ottawa, Canada

[73] Assignee: Northern Telecom Limited, Montreal, Canada

[21] Appl. No.: 688,093

[22] Filed: Dec. 31, 1984

[51] Int. Cl.⁴ .............................................. H04J 3/26
[52] U.S. Cl. ..................................................... 370/94
[58] Field of Search ........................... 370/94, 60, 112

[56] References Cited

U.S. PATENT DOCUMENTS 4,456,989  6/1984  Johnson et al. ...................... 370/94

FOREIGN PATENT DOCUMENTS 2497041  6/1982  France ................................. 370/94
2516730  5/1983  France ................................. 370/94

Primary Examiner—Douglas W. Olms
Attorney, Agent, or Firm—R. John Haley

[57] ABSTRACT

Asynchronous packets for a plurality of channels, each packet comprising a channel address and two information bytes, are stored in a FIFO. The address in the packet is used with a first pointer to address a RAM for storing the bytes therein. The RAM is cyclically addressed by a channel address together with a second pointer to read the bytes out synchronously to the relevant channel. Updating of the second pointer is inhibited for each channel initially to prime the RAM with bytes for the channel, and if the pointers become equal. The bytes may comprise speech samples or data. A mapped memory may be provided for converting between channel addresses in the packets and output channel addresses.

9 Claims, 1 Drawing Figure

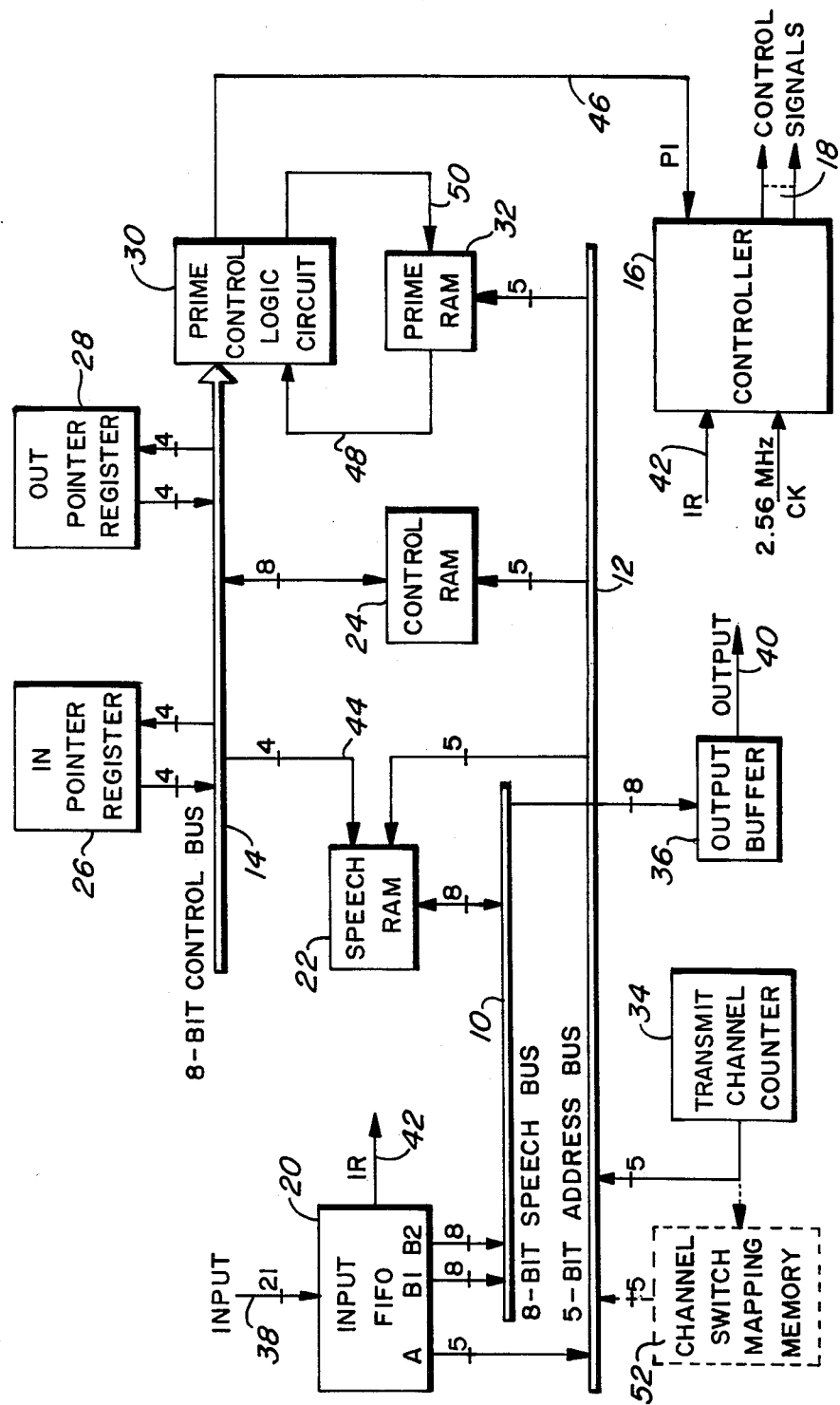

MULTIPLE CHANNEL DEPACKETIZER

This invention relates to a depacketizer for assigning synchrously to respective ones of a plurality of channels information from packets which occur asynchronously and each of which includes, in addition to said information, an address in respect of the channel for which the information is intended.

In a telephone switching system, it is known to convert speech signals to be switched into packets each of which comprises one or more speech signal samples, constituting the information of the packet, and an address representing the destination for which the information is intended. The speech signal samples may be replaced by data bytes for switching data in the same manner.

The destination may, for example, be constituted by a time channel of a tdm (time division multiplexed) transmission line. For such a line having up to 32 multiplexed time channels, each packet requires a 5-bit address to identify the channel for which it is intended. For transmission on the line, the packets for each time channel must be buffered and re-timed for correct transmission. In addition, although the packets intended for any individual channel arrive from the switching system in their proper sequence (although with random timing), the routing of packets through the switching system is such that the packets for different time channels may arrive in randomly varying and arbitrary orders. For example, considering only three channels A, B, and C, successive packets for these channels may arrive from the switching system in an arbitrary order such as ABCBACBCA.

A depacketizer is required to buffer and retime the packets for proper transmission to their respective destinations. In the prior art, this has been provided by buffering and retiming the packets for each channel individually, and then multiplexing the individual channels for transmission. This invention seeks to provide an improved depacketizer for handling the packets for all of the channels commonly.

According to this invention there is provided a depacketizer for assigning synchrously to respective ones of a plurality of channels information from packets which occur asynchronously and each of which includes, in addition to said information, an address in respect of the channel for which the information is intended, the depacketizer comprising: first memory means for storing packets asynchronously as they occur; second memory means having a plurality of addressable memory blocks, one in respect of each channel, each for storing the information from a plurality of packets of the respective channel; first address means responsive to each packet stored in the first memory means for addressing a memory block of the second memory means in dependence upon the address of the packet and storing the information of the packet in the addressed memory block; second address means for cyclically addressing the memory blocks of the second memory means; and means for reading the information for each channel from the cyclically addressed memory blocks of the second memory means.

The first memory means is preferably a first-in, first-out buffer, and the second memory means is conveniently a random access memory.

The depacketizer preferably includes: third memory means for storing in respect of each channel first and second pointers indicating locations in the memory block of the second memory means for the respective channel for respectively storing and reading said information; the first address means being responsive to the address of the packet to address the third memory means to read the respective first pointer therefrom, to address a location in the respective memory block of the second memory means in dependence upon the first pointer for storing the information of the packet, and to update the first pointer and store the updated first pointer in the third memory means; and the second address means being responsive to the cyclical addressing of each memory block to address the third memory means to read the respective second pointer therefrom, to address a location in the respective memory block in dependence upon the second pointer, and to update the second pointer and store the updated second pointer in the third memory means.

In order to provide proper buffering and dejittering, the depacketizer preferably includes means for inhibiting updating of the second pointer stored in respect of each channel in the third memory means in response to the first and second pointers of the channel being equal, until the pointers differ from one another by at least a predetermined amount. This enables the second memory means to be primed with information before this starts to be read out.

Each packet may comprise a plurality of bytes of information. In such a case the bytes are stored ih successive locations of the respective memory block of the second memory means whereby they are read in successive address cycles of the second address means, the first address means being responsive to the address of the packet to store said bytes in said successive locations and to update the first pointer in response to the storage of each byte.

The packet address and the cyclical address of each channel may be different, in which case the depacketizer preferably includes address conversion means, such as a mapped memory, for converting one of said addresses to the other for addressing the second and third memory means.

The invention will be further described with reference to the accompanying drawing, which illustrates by way of example a block diagram of a depacketizer in accordance with an embodiment of the invention.

Referring to the drawing, the depacketizer includes three buses, namely an 8-bit wide speech bus 10, a 5-bit wide address bus 12, and an 8-bit wide control bus 14, via which the blocks of the depacketizer are interconnected. A controller 16 is supplied with a 2.56 MHz clock signal CK and signals IR and PI which are described below, and supplies control signals via lines 18 to the rest of the depacketizer in order to effect and control the sequences of events described in detail below.

The depacketizer comprises a 21-bit wide input FIFO (first-in, first-out buffer) 20, a 512 by 8-bit speech RAM (random access memory) 22, a 32 by 8-bit control RAM 24, two 4-bit pointer registers 26 and 28 each of which is arranged to store and readily increment a 4-bit pointer, a prime control logic circuit 30, a 32 by 1-bit prime RAM 32, a transmit channel counter 34 which is arranged to count cyclically through 32 channel addresses, and an 8-bit output buffer 36.

The depacketizer serves to convert speech packets which occur asynchronously on a 21-bit wide input path 38 into 8-bit bytes which are produced synchronously in respective time slots on an output path 40.

Each 21-bit packet comprises a 5-bit address, identifying a respective one of 32 possible output time channels, and two 8-bit speech bytes which are intended to be produced consecutively on the respective output time channel. The packets are loaded asynchronously into the input FIFO 20 by a switching system to which the depacketizer is connected in use, the capacity of the FIFO 20 being determined by the nature of the switching system but for example being 64 packets. Whenever the FIFO 20 is not empty, it supplies the signal IR (input ready) on a line 42 to the controller 16.

A 5-bit address, supplied selectively by the input FIFO 20 or the transmit channel counter 34 to the address bus 12, is used to address one of the 32 memory locations in each of the RAMs 24 and 32, and to address one of 32 blocks of memory into which the speech RAM 22 is divided. Each block of memory in the speech RAM 22 consists of 16 consecutive memory locations for a respective time channel, one of these 16 locations being selected by a 4-bit pointer which is supplied from one of the registers 26 and 28 via the control bus 14 to 4 address lines 44 of the speech RAM 22. The control RAM 24 stores for each of the 32 time channels two 4-bit pointers, referred to below as the IN and OUT pointers, to be loaded into the registers 26 and 28 respectively via the control bus 14. The IN pointer constitutes the address at which the next speech byte is to be stored in the speech RAM memory block for the respective time channel, and the OUT pointer constitutes the address from which the next byte is to be read from the respective speech RAM memory block for transmission to the output path 40. The IN and OUT pointers are incremented after each speech RAM write and read operation, respectively, so that they cycle through the memory block for each time channel. The prime control logic circuit 30 and RAM 32 serve to monitor the relative locations of the IN and OUT pointers as described below.

For controlling the operation of the depacketizer, the controller 16 repeatedly cycles through a sequence occupying 10 periods of the clock signal CK, or 3.9 microseconds. During each such sequence, one packet may be taken from the input FIFO 20 and have its speech bytes stored in the speech RAM 22, and one speech byte is read from the speech RAM 22 via the output buffer 36 to the output path 40. This sequence is described in detail below, the steps 1 to 10 corresponding to the respective clock signal periods in the 10-period sequence.

STEP 1

The controller 16 checks the input ready signal IR to determine whether there is a packet in the input FIFO 20. If there is no packet available, no action takes place in steps 1 through 6 (a null input cycle). If a packet is available, the following actions in steps 1 through 6 are taken.

The address output A and the first byte output B1, at which respectively the 5-bit address and the 8-bit first speech byte of the packet to be read are present, of the input FIFO 20 are enabled to respectively the address bus 12 and the speech bus 10. The 5-bit address addresses the RAMs 22, 24, and 32, and the output of the control RAM 24, comprising the IN and OUT pointers for the respective time channel, is enabled to the control bus 14.

STEP 2

The IN and OUT pointers are latched in the registers 26 and 28 respectively, the output of the control RAM 24 is disabled from the control bus 14, and the outputs of the registers 26 and 28 are enabled to the control bus 14. The IN pointer from the register 26 is supplied to the address lines 44.

STEP 3

The controller 16 supplies a write pulse to the speech RAM 22, so that the first byte of the packet is stored in the speech RAM 22 in the memory block determined by the address on the address bus 12 and at the location in that memory block determined by the IN pointer on the lines 44.

STEP 4

The IN pointer is incremented in the register 26, the B1 output of the input FIFO 20 is disabled from the speech bus 10, and the B2 output of the input FIFO 20 is enabled to the speech bus 10 to supply the second 8-bit speech byte of the packet thereto.

STEP 5

A write pulse is supplied to the speech RAM 22 to store the second byte of the packet therein.

STEP 6

The IN pointer is incremented in the register 26, and a write pulse is supplied to the control RAM 24 to store the updated IN pointer and the unchanged OUT pointer therein at the address of the relevant channel. The outputs of the registers 26 and 28 are then disabled from the control bus 14, and the outputs A and B2 of the input FIFO 20 are disabled from the buses 12 and 10 respectively.

STEP 7

The transmit channel counter 34 is incremented and its output is enabled to the address bus 12. The 5-bit address thus supplied to the bus 12 is completely independent of the channel address discussed above in steps 1 through 6. The output of the control RAM 24 is enabled to the control bus 14 to supply thereto the IN and OUT pointers for the transmit time channel whose address is on the address bus 12.

STEP 8

The IN and OUT pointers are latched in the registers 26 and 28 respectively, the output of the control RAM 24 is disabled from the control bus 14, and the outputs of the registers 26 and 28 are enabled to the control bus 14. The OUT pointer from the register 28 is supplied to the address lines 44.

STEP 9

A load pulse is supplied to the output buffer 36 to cause it to latch the 8-bit speech byte on the speech bus 10, this being supplied from the speech RAM 22 at the location addressed by the OUT pointer on the address lines 44 in the memory block addressed by the transmit channel count on the address bus 12. The OUT pointer is incremented in the register 28.

STEP 10

A write pulse is supplied to the prime RAM 32 to update its contents for the addressed time channel as discussed below. In the absence of the prime inhibit signal PI, supplied on a line 46 from the prime control logic circuit 30 to the controller 16, a write pulse is also supplied to the control RAM 24 to store the unchanged IN pointer and the updated OUT pointer therein at the address of the transmit time channel. In the presence of the signal PI, this latter write pulse is inhibited so that the OUT pointer of the transmit time channel is not updated, as discussed below. In either case, the outputs of the transmit channel counter 34 and the registers 26 and 28 are then disabled from the buses 12 and 14 respectively.

It should be appreciated from the above description that steps 1 through 6 constitute a write cycle to the speech RAM 22, during which if there is a packet in the input FIFO 20 its two speech bytes are transferred to appropriate locations in the RAM 22, and steps 7 through 10 constitute a read cycle from the speech RAM 22, during which the next speech byte of the relevant transmit time channel is transferred from the RAM 22 to the output buffer 36. The bits of this byte are synchronously transferred to the output path 40 in known manner. Thus the necessary conversion from double-byte asynchronous packets to synchronous, dejittered, speech bytes in respective time channels is effected.

It will also be observed that in steps 2 and 8 the speech RAM address lines 44 are supplied with different pointers, and thus must be connected to different halves of the 8-bit control bus 14. This is conveniently achieved by coupling the IN and OUT pointer halves of the control bus 14 to the address lines 44 via a multiplexer (not shown) which is controlled during the write cycle (steps 1 through 6) to couple the IN pointer to the lines 44 and during the read cycle (steps 7 through 10) to couple the OUT pointer to the lines 44.

The above description relates to a normal operating situation in which for each time channel the IN and OUT pointers chase, but never catch, one another in cycling through the locations of the respective speech RAM memory block. The size of each memory block in the speech RAM 22 is selected, in relation to the characteristics of the switching system with which the depacketizer is used, so that the IN pointer can not catch up with the OUT pointer. However, the OUT pointer can catch up with the IN pointer in the event that there is an interruption in the supply of packets for the time channel. Furthermore, for proper buffering and dejittering of speech bytes it is desirable that, following such an interruption and on start-up of operation, the speech RAM 22 be primed, or partly filled, with speech bytes for the time channel before these are transferred to the output buffer 36. The prime control logic circuit 30 and the prime RAM 32 handle these situations.

The prime RAM 32 stores for each time channel one bit, referred to as the prime bit, whose state indicates whether or not the speech RAM 22 is primed with speech bytes for the channel. The prime bit of the transmit time channel is supplied from the prime RAM 32 on a line 48, and the IN and OUT pointers of the channel are supplied from the registers 26 and 28 via the control bus 14, to the prime control logic circuit 30 during steps 9 and 10 of the above sequence. The prime control logic circuit 30 is conveniently a ROM (read only memory) which is addressed by the prime bit and IN and OUT pointers to produce a 2-bit output constituting the current prime inhibit signal on the line 46 and an updated prime bit, which is stored in the prime RAM 32 during step 10 as indicated above, on a line 50.

When the prime bit is zero (speech RAM 22 unprimed), the circuit 30 produces the signal PI on the line 46 and an updated prime bit of zero on the line 46 until the speech RAM memory block for the relevant time channel is half full (i.e. until the updated OUT pointer is 8 bytes cyclically behind the IN pointer), whereupon it does not produce the signal PI and produces an updated prime bit of one. When the prime bit is one, the circuit 30 does not produce the signal PI and produces an updated prime bit of one unless the updated OUT pointer catches up with (i.e. is equal to) the IN pointer, in which case it produces an updated prime bit of zero.

Thus in the above manner the prime control logic circuit 30 and the prime RAM 32 ensure that there is adequate buffering of speech bytes between the asynchronous input and the synchronous output of the depacketizer. In the absence of such buffering (i.e. the unprimed state, prime bit of zero), the same byte is repeatedly read from the speech RAM 22 and supplied to the output path 40 via the output buffer 36.

The depacketizer described above can be modified to provide a channel switching function between its input and output. In other words, the transmit channel addresses need not be constituted by the channel addresses in the incoming packets, but instead can be independently assigned. To this end, the drawing shows in broken lines a channel switch mapping memory 52, having five address lines and a five-bit output, which can be used for channel address conversion. With such a mapping memory, the output of the transmit channel counter 34 is used to address the memory 52, whose output is a converted address which is supplied to the address bus 12 for addressing the RAMs 22, 24, and 32 during steps 7 through 10 of the above-described sequence. Alternatively, and equivalently, a channel switch mapping memory can be addressed by the A output of the input FIFO 20 and its 5-bit output applied to the address bus 12 as a converted address during steps 1 through 6 of the above-described sequence. In either case, the depacketizer then provides a channel switching function as well as its depacketizing function.

Although the invention has been described above in relation to packets containing two speech bytes and a five-bit address for identifying any one of up to 32 different channels, the invention is not limited thereto. In particular, the invention is equally applicable to different sizes and types of packets, different byte, address, and memory sizes, different clock and transmission rates, different numbers of channels, and to the handling of data bytes instead of and in addition to speech bytes. Numerous other modifications, variations, and adaptations may be made to the particular embodiment of the invention described above without departing from the scope of the invention as defined in the claims.

What is claimed is:

1. A depacketizer for assigning synchrously to respective ones of a plurality of channels information from packets which occur asynchronously and each of which includes, in addition to said infomation, an address in respect of the channel for which the information is intended, the depacketizer comprising:
    first memory means for storing packets asynchronously as they occur;
    second memory means having a plurality of addressable memory blocks, one in respect of each channel, each for storing the information from a plurality of packets of the respective channel;
    first address means responsive to each packet stored in the first memory means for addressing a memory block of the second memory means in dependence upon the address of the packet and storing the information of the packet in the addressed memory block;
    second address means for cyclically addressing the memory blocks of the second memory means; and
    means for reading the information for each channel from the cyclically addressed memory blocks of the second memory means.

2. A depacketizer as claimed in claim 1 and including:
third memory means for storing in respect of each channel first and second pointers indicating locations in the memory block of the second memory means for the respective channel for respectively storing and reading said information;
wherein the first address means is responsive to the address of the packet to address the third memory means to read the respective first pointer therefrom, to address a location in the respective memory block of the second memory means in dependence upon the first pointer for storing the information of the packet, and to update the first pointer and store the updated first pointer in the third memory means; and
wherein the second address means is responsive to the cyclical addressing of each memory block to address the third memory means to read the respective second pointer therefrom, to address a location in the respective memory block in dependence upon the second pointer, and to update the second pointer and store the updated second pointer in the third memory means.

3. A depacketizer as claimed in claim 2 and including means for inhibiting updating of the second pointer stored in respect of each channel in the third memory means in response to the second pointer of the channel being equal to the first pointer of the channel.

4. A depacketizer as claimed in claim 3 wherein said means for inhibiting updating of the second pointer of each channel is responsive to the first and second pointers of the channel being equal to inhibit updating of the second pointer until the first and second pointers of the channel differ from one another by at least a predetermined amount.

5. A depacketizer as claimed in claim 2 wherein each packet comprises a plurality of bytes of information and said bytes are stored in successive locations of the respective memory block of the second memory means whereby they are read in successive address cycles of the second address means, wherein the first adddress means is responsive to the address of the packet to store said bytes in said successive locations and to update the first pointer in response to the storage of each byte.

6. A depacketizer as claimed in claim 1 wherein the packet address and the cyclical address of each channel may be different, the depacketizer including address conversion means for converting one of said addresses to the other for addressing the second memory means.

7. A depacketizer as claimed in claim 2 wherein the packet address and the cyclical address of each channel may be different, the depacketizer including address conversion means for converting one of said addresses to the other for addressing the second and third memory means.

8. A depacketizer as claimed in claim 1 wherein the first memory means comprises a first-in, first-out buffer.

9. A depacketizer as claimed in claim 1 wherein the second memory means comprises a random access memory.

* * * * *